H. A. SELAH.
GAS METER.
APPLICATION FILED SEPT. 15, 1908.
920,090.
Patented Apr. 27, 1909.
2 SHEETS—SHEET 1.
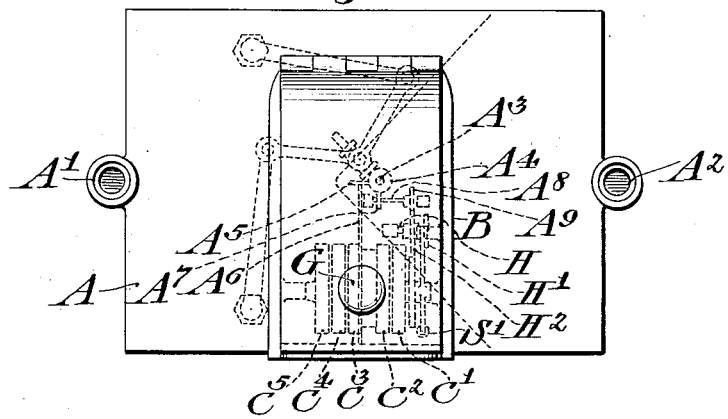
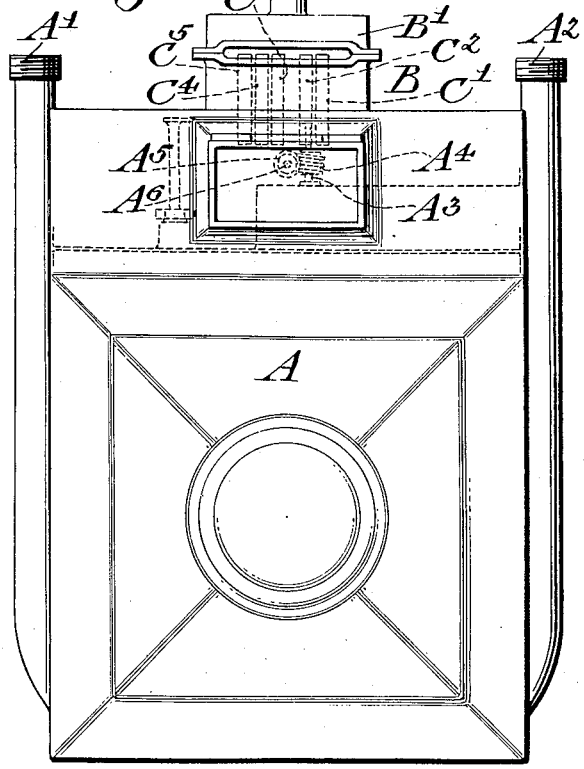
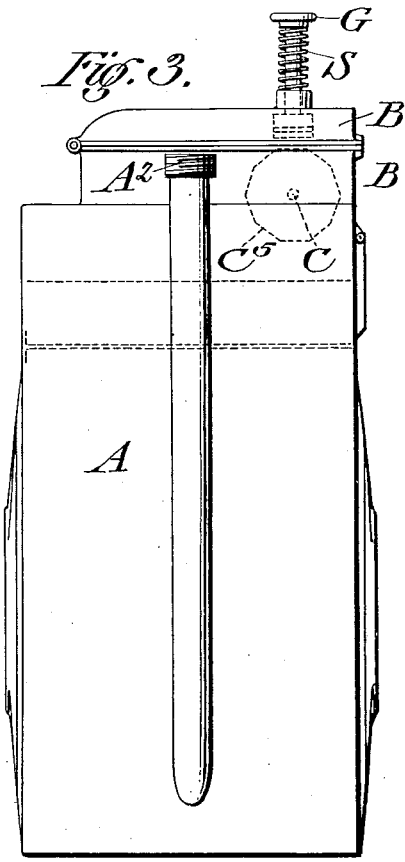
WITNESSES:
INVENTOR
Howard A. Selah
BY
David S. Williams
ATTORNEY.

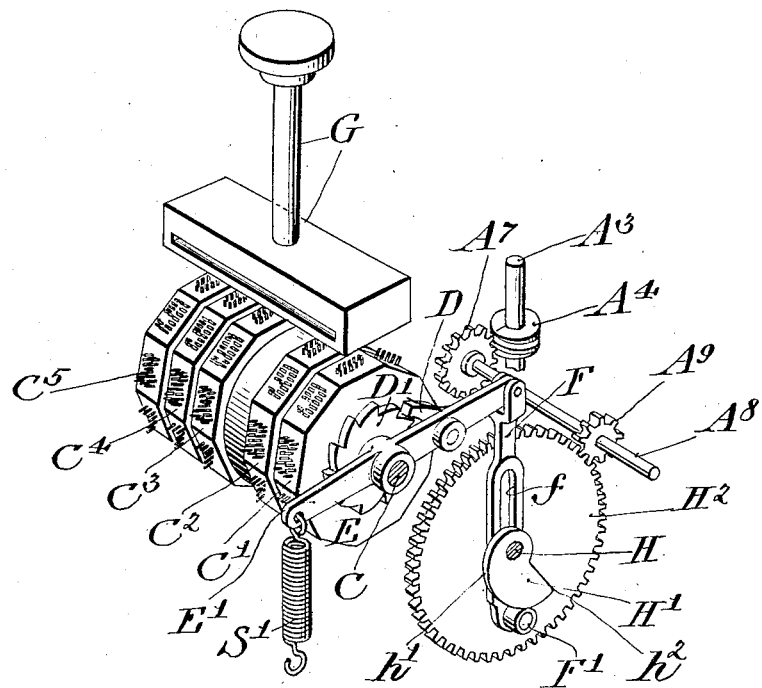

UNITED STATES PATENT OFFICE.

HOWARD A. SELAH, OF WILDWOOD, NEW JERSEY, ASSIGNOR OF ONE-HALF TO JAMES McLINDEN, OF NORTH WILDWOOD, NEW JERSEY.

GAS-METER.

No. 920,090.        Specification of Letters Patent.      Patented April 27, 1909.

Application filed September 15, 1908. Serial No. 453,150.

*To all whom it may concern:*

Be it known that I, HOWARD A. SELAH, a citizen of the United States, residing at Wildwood, in the county of Cape May and State of New Jersey, have invented certain new and useful Improvements in Gas-Meters, of which the following is a specification.

My invention relates to a device for making a record or bill of the amount of gas which has passed through a meter, the object of the invention being to provide in connection with a meter of the ordinary type a device by means of which the local inspector of the meter, instead of reading the meter, and making a record thereof for delivery to the office, will at once take a duplicate record from the recording mechanisms, one of which will be presented to the consumer as a bill, and the other will be delivered by the inspector to the office of the company.

One of the objects of my invention is the construction and arrangement of the mechanism for operating the recording disks whereby the power incident to the slow motion of the meter shaft may be gradually stored up and at a given time released to impart a quick motion to the recording disks.

Other features of construction and arrangement which characterize my invention are pointed out with particularity in the claims annexed to and forming a part of this specification. For a better understanding of my invention however, and the advantages possessed by it, reference may be had to the accompanying drawings and descriptive matter in which I have illustrated and described one of the forms in which my invention may be embodied.

In the drawings, Figure 1 is a plan view of a gas meter provided with my improvement, the mechanism of the meter and recording device being shown in dotted lines. Fig. 2 is a front elevation of the same. Fig. 3 a side elevation and Fig. 4 a detached perspective view of the plunger, recording wheels and mechanism for operating the same.

Referring to the reference letters of the drawings A, is the body of the meter which is provided with an inlet pipe $A^1$ and a discharge pipe $A^2$. The mechanism of the meter proper is of the conventional type having a vertical shaft $A^3$ provided with a worm $A^4$, which meshes with a worm wheel $A^5$ on a shaft $A^6$, which latter carries a pointer of the small dial of the ordinary registering device, one revolution of which registers the passage of two cubic feet of gas through the meter.

The device forming the subject matter of my invention comprises a box or casing B, mounted upon the top of the meter and provided with a hinged lid or cover $B^1$, to permit of ready access to the working parts of the device. Between the parts B and $B^1$ a slot $B^2$ is found through which a folded sheet of paper constituting a duplicate bill head may be passed to be acted upon by the recording mechanism. The recording mechanism comprises a series of counting wheels $C^1$, $C^2$, $C^3$, $C^4$ and $C^5$ mounted upon a shaft C and journaled within the casing B. It is sufficient to state that each of the counting wheels is provided with a ratchet wheel having ten teeth adapted to be operated upon by a suitable spring pressed pawl. The units wheel $C^1$ is worked by a separate pawl D, while all the other pawls (not shown) ride idly upon disks until a notch in one of the disks is reached when the pawl drops into the notch and being of sufficient width to cover the adjacent ratchet wheel on the second or tens wheel it turns it one revolution and similarly with the hundred and thousand wheels.

The numerals on the counting wheels $C^1$, $C^2$, etc., are preferably outlined with projecting points for the purpose of perforating the folded strip of paper inserted between the counting wheels and a plunger G. When a strip of paper is inserted in the aforesaid manner, the plunger G, is pressed downward against the action of a sprial spring S, and the projecting points will be pressed through the paper into openings in the bottom of the plunger and the perforated record thus obtained will show at once the cost to the consumer of the gas which has passed through the meter.

In order to place the device at all times in position to record and avoid damage to counting wheels and other parts of the mechanism by depressing the plunger when said wheels are in the act of turning, it is necessary to convert the extremely slow motion of the meter mechanism into a quick motion for operating the counting wheels which I accomplish in the following manner. The ratchet mechanism E, comprises a ratchet lever E¹ mounted loosely upon the shaft C, one end of said lever being provided with a spiral spring S¹ and the other with the pawl D, and a cam lever F. The cam lever F, is slotted as shown at $f$, to straddle a cam shaft H, upon which is mounted a cam H¹ and a gear wheel H², and is provided at its lower extremity with a roller F¹, which is brought to bear upon the surface of the cam by the spring S¹. The cam H¹ is made in the form of a scroll cam having a gradually inclined portion $h^1$, over which the roller F¹ rides and an abrupt terminus indicated at $h^2$ which enables the spring S¹ to return the roller to the lower most point of the cam with a quick movement. The cam-shaft H, is driven by a suitable train of gearing from the vertical shaft A² and worm A⁴ including a worm wheel A⁷, mounted upon a shaft A⁸, which carries a pinion A⁹, to engage the gear wheel H².

Having described my invention what I claim as new and desire to secure by Letters Patent is:

1. A device of the character specified, comprising a series of operatively connected recording wheels, a shaft therefor, a ratchet wheel directly connected to the first recording wheel of the series, a ratchet-lever loosely hung to said shaft, a spring connected at one end to the short arm of ratchet lever and at the other to the frame of the device, a pawl together with a cam lever connected to the long arm of the ratchet lever, a roller mounted upon the cam lever and a cam adapted to engage said roller to operate the cam lever and the attached ratchet lever against the action of said spring.

2. A device of the character specified comprising a series of operatively connected recording wheels, a shaft for supporting the recording wheels, a plunger arranged above the recording wheels and adapted to be manually operated to press a strip of paper into engagement with the recording wheels, a ratchet wheel connected to one of the recording wheels, a ratchet lever journaled upon the shaft supporting the recording wheels and provided with a spring pressed pawl adapted to engage the ratchet wheel, a spring interposed between the frame of the device and one end of the ratchet lever, a cam lever connected to the other end of the ratchet lever and a cam operated from a main source of power and adapted to operate the cam lever.

In testimony whereof I affix my signature in presence of two witnesses.

HOWARD A. SELAH.

Witnesses:
DAVID S. WILLIAMS,
ARNOLD KATZ.